United States Patent
Helms, III et al.

(10) Patent No.: US 8,407,177 B2
(45) Date of Patent: Mar. 26, 2013

(54) SYSTEM AND ASSOCIATED METHOD FOR DETERMINING AND APPLYING SOCIOCULTURAL CHARACTERISTICS

(75) Inventors: Robert F. Helms, III, Sanford, NC (US); Raymond J. Morris, Pittsboro, NC (US)

(73) Assignee: Integrated Training Solutions, Inc., Sanford, NC (US)

( * ) Notice: Subject to any disclaimer, the term of this patent is extended or adjusted under 35 U.S.C. 154(b) by 778 days.

(21) Appl. No.: 12/488,881

(22) Filed: Jun. 22, 2009

(65) Prior Publication Data

US 2010/0325081 A1    Dec. 23, 2010

(51) Int. Cl.
*G06F 9/44*    (2006.01)
*G06N 7/02*    (2006.01)
*G06N 7/06*    (2006.01)

(52) U.S. Cl. .......................................................... 706/52
(58) Field of Classification Search ...................... 706/52
See application file for complete search history.

(56) References Cited

U.S. PATENT DOCUMENTS

| | | | |
|---|---|---|---|
| 2002/0107721 A1 | 8/2002 | Darwent et al. | |
| 2003/0175667 A1* | 9/2003 | Fitzsimmons, Jr. | 434/236 |
| 2003/0187660 A1 | 10/2003 | Gong | |
| 2005/0222811 A1* | 10/2005 | Jakobson et al. | 702/183 |
| 2006/0059113 A1* | 3/2006 | Kuznar et al. | 706/45 |
| 2006/0122903 A1* | 6/2006 | Medrano et al. | 705/26 |
| 2007/0008408 A1 | 1/2007 | Zehavi | |
| 2007/0143329 A1* | 6/2007 | Vigen | 707/101 |
| 2008/0044048 A1 | 2/2008 | Pentland | |
| 2008/0273088 A1 | 11/2008 | Shu et al. | |
| 2009/0144418 A1 | 6/2009 | Alstyne et al. | |
| 2009/0326872 A1* | 12/2009 | Rubin et al. | 703/1 |

* cited by examiner

*Primary Examiner* — Kakali Chaki
*Assistant Examiner* — Ababacar Seck
(74) *Attorney, Agent, or Firm* — Womble Carlyle Sandridge & Rice, LLP

(57) ABSTRACT

A computer system and associated method are provided for evaluating a sociocultural event associated with a target human subject. An analytical processing device analyzes a communication sample associated with the sociocultural event involving the target human subject to determine an apparent cultural data element, an apparent linguistic data element, a contextual data element, and/or a communicative data element associated with the communication sample. A correlative processing device correlates the contextual data element with a projected cultural data element and/or a projected linguistic data element expected of a corresponding hypothetical human subject. A comparative processing device compares the apparent cultural data element and/or the apparent linguistic data element with the corresponding projected linguistic data element and/or the projected cultural data element to determine whether the sociocultural event is consistent with the target human subject.

16 Claims, 3 Drawing Sheets

Figure 1:
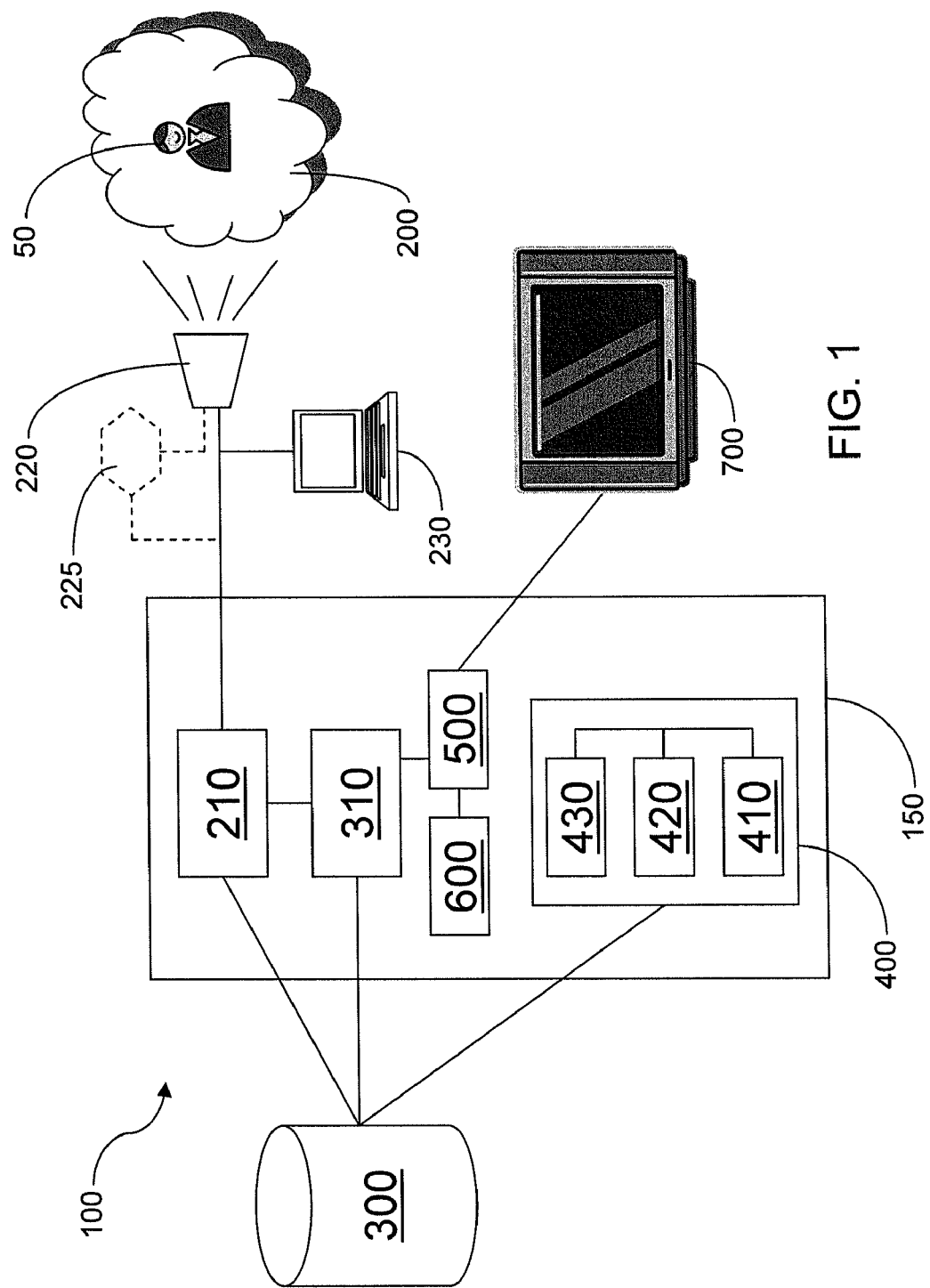

SYSTEM AND ASSOCIATED METHOD FOR DETERMINING AND APPLYING SOCIOCULTURAL CHARACTERISTICS

BACKGROUND OF THE INVENTION

1. Field of the Invention

Embodiments of the present invention relate to the evaluation of sociocultural characteristics and, more particularly, to a system and associated method for determining and applying sociocultural characteristics to determine whether communications originating from a targeted human subject are consistent with a hypothetical human subject having the same sociocultural characteristics.

2. Description of Related Art

There may be instances where accurate evaluation of a human subject may be critical for preventing consequential damages. For example, the security of a population may rely on an accurate evaluation of each person attempting to cross a border to enter that population. Often, the evaluation of those persons attempting to cross the border must be conducted by other humans (i.e., border guards), who may be relied upon to apply a criteria for permitting or denying entry to those persons. However, the border guard may not necessarily be able to discern whether or not the information provided by the person, such as responses, characteristics, mannerisms, etc., is reliable and meets the criteria for entry. In other instances, the border guard may not necessarily be able to discern whether the person is being truthful or deceptive.

As such, there exists a need for a system and/or method for determining and evaluating sociocultural characteristics, and applying such sociocultural characteristics, such that an objective or quasi-objective evaluation of human subjects can be quickly and efficiently performed so as to allow expedited decisions to be rendered upon interaction with a particular human subject.

BRIEF SUMMARY OF THE INVENTION

The above and other needs are met by embodiments of the present invention which, according to one aspect, provides a computer system for evaluating a sociocultural event associated with and at least partially originating from a target human subject. Such a system comprises an analytical processing device configured to receive and analyze a communication sample associated with the sociocultural event involving the target human subject to determine one of an apparent cultural data element, an apparent linguistic data element and a contextual data element, wherein each data element is associated with the communication sample, and wherein the contextual data element further includes a communicative data element. A correlative processing device is configured to receive the contextual data element and to correlate the contextual data element with one of a projected cultural data element and a projected linguistic data element expected of a corresponding hypothetical human subject. A comparative processing device is configured to receive one of the apparent cultural data element and the apparent linguistic data element and to compare the one of the apparent cultural data element and the apparent linguistic data element with the corresponding one of the projected linguistic data element and the projected cultural data element to determine whether the sociocultural event is consistent with the target human subject.

Yet another aspect provides a method of evaluating a sociocultural event, associated with and at least partially originating from a target human subject, with a computer system. Such a method comprises receiving and analyzing, using an analytical processing device, a communication sample associated with the sociocultural event involving the target human subject to determine one of an apparent cultural data element, an apparent linguistic data element and a contextual data element, wherein each data element is associated with the communication sample, and wherein the contextual data element further includes a communicative data element. Using a correlative processing device, the contextual data element is correlated with one of a projected cultural data element and a projected linguistic data element expected of a corresponding hypothetical human subject. Using a comparative processing device, the one of the apparent cultural data element and the apparent linguistic data element is compared with the corresponding one of the projected cultural data element and the projected linguistic data element to determine whether the sociocultural event is consistent with the target human subject Aspects of the present invention thus provide significant advantages as otherwise detailed herein.

BRIEF DESCRIPTION OF THE SEVERAL VIEWS OF THE DRAWING(S)

Figure 2:
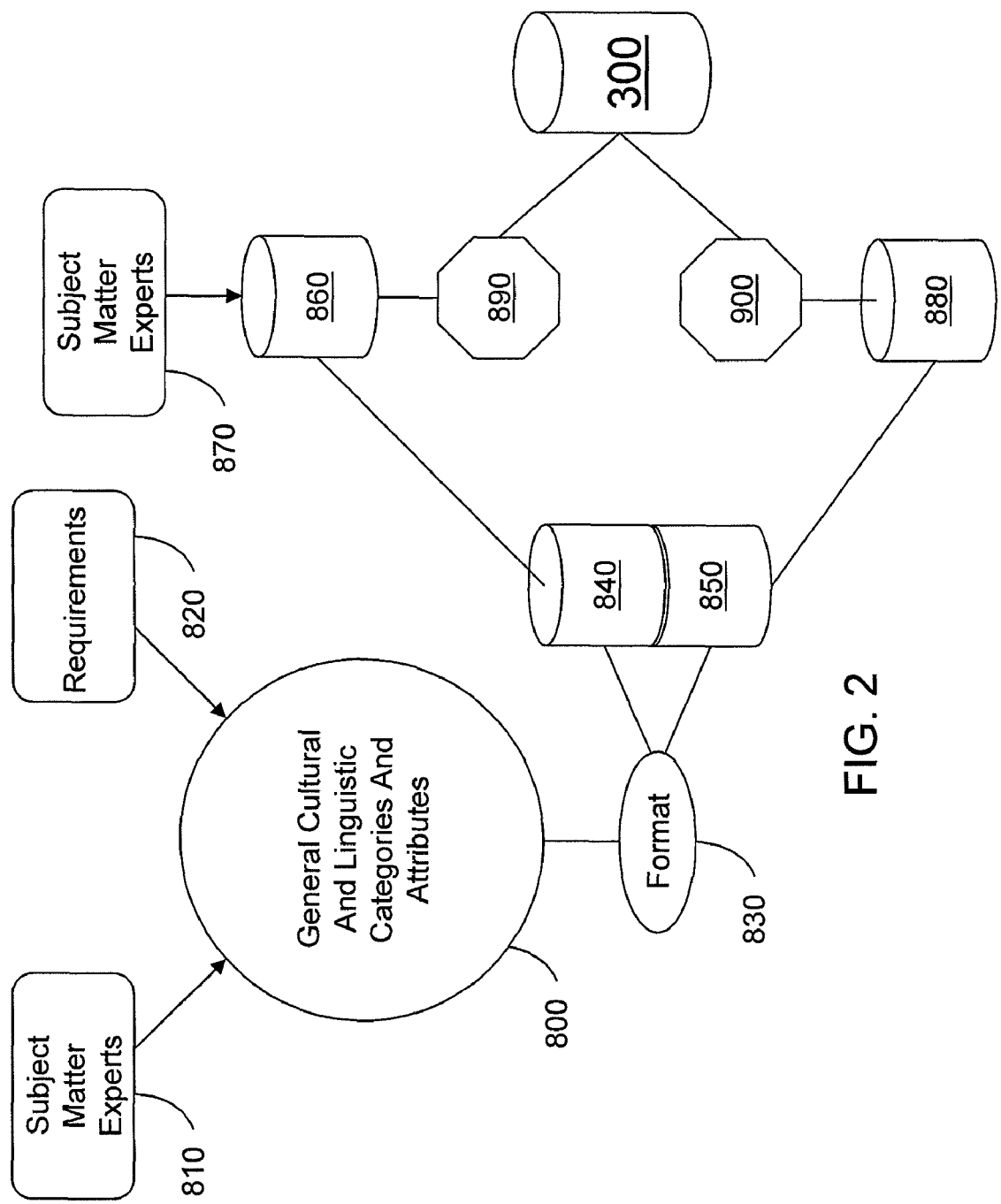
Figure 3:
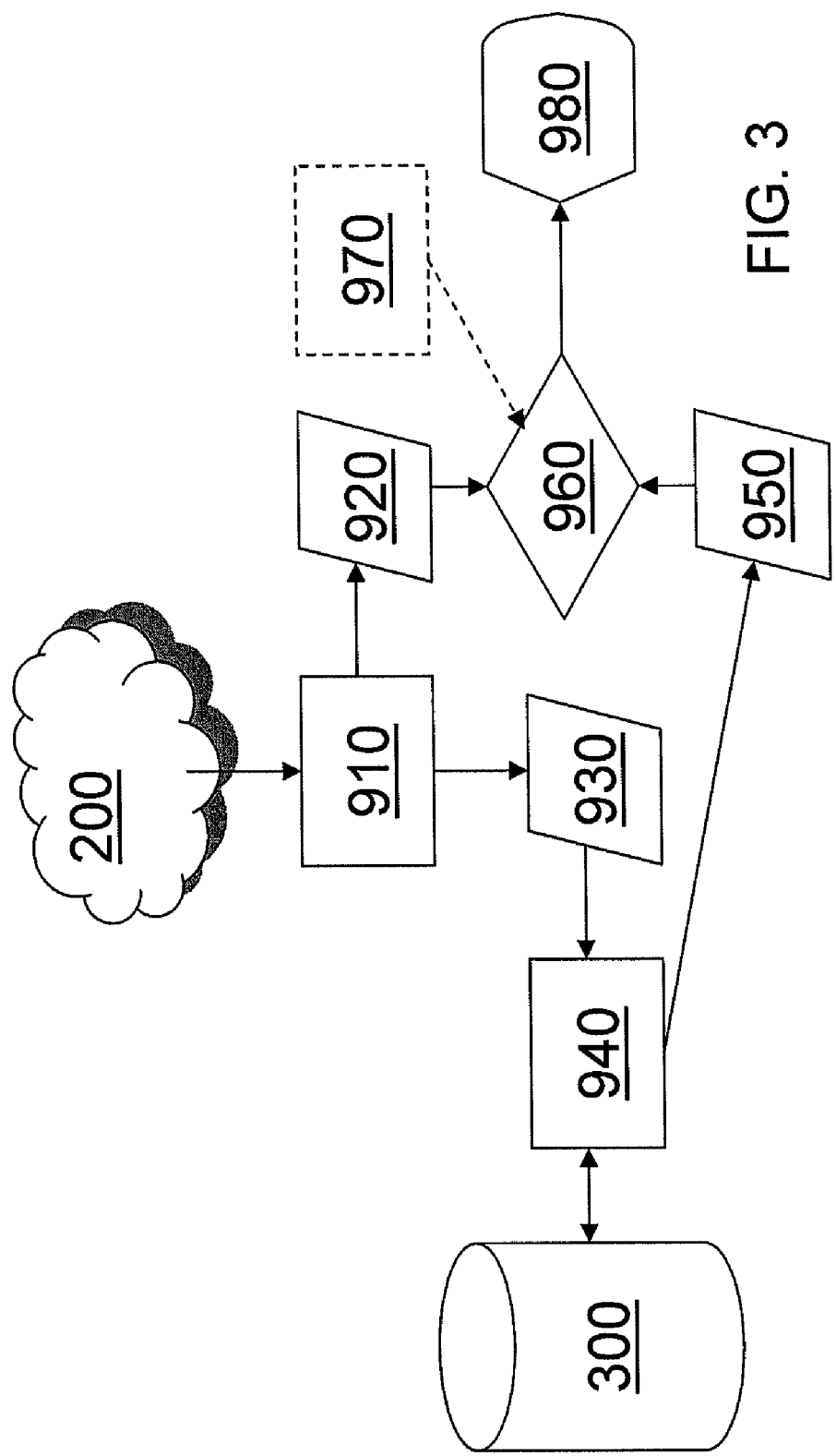

Having thus described the invention in general terms, reference will now be made to the accompanying drawings, which are not necessarily drawn to scale, and wherein:

FIG. 1 is a schematic illustration of a system for determining and applying sociocultural characteristics, according to one aspect of the present invention;

FIG. 2 is a schematic illustration of an arrangement for establishing a database implemented by a system for determining and applying sociocultural characteristics, according to one aspect of the present invention; and FIG. 3 is a schematic illustration of an arrangement for analyzing a communication sample, with respect to a database as shown in FIG. 2, using a system for determining and applying sociocultural characteristics, according to one aspect of the present invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a system for determining and applying sociocultural characteristics, according to one aspect of the present invention, the system being indicated by the numeral 100. Such a system 100 can comprised of hardware, software, or a combination of software and hardware, as will be appreciated by one of skill in the art. For example, the system 100 can be generally associated with and/or comprised of software executed by one or more processing portions/modules of one or more computer devices. More particularly, in one aspect, an exemplary system 100 may be configured to (1) receive, as input, a communication sample 200 such as categories, attributes, and/or raw audio (with or without partial transcription) and/or visual data associated with or at least partially originating from a particular target population or a target human subject (collectively element 50) belonging to that population (FIG. 3, element 910); (2) process the input to determine contextual/communicative data elements (FIG. 3, collectively element 930), apparent cultural data elements and/or apparent linguistic data elements (FIG. 3, collectively element 920) associated with the communication sample 200 obtained from the particular population/target human subject 50; (3) correlate at least the contextual data elements with a database 300 (FIG. 3, element 940) having data representing the particular population/target human subject 50, so as to determine a projected linguistic data element and/or a projected cultural data element (FIG. 3, collectively element 950) expected of a corresponding hypothetical human subject exhibiting at least the input contextual data elements; and (4) process the correlation by comparing one of the apparent cultural data element and the apparent linguistic data element with the corresponding one of the projected linguistic data element and/or the projected cultural data element associated with the corresponding hypothetical human subject (FIG. 3, collectively element 960) to determine whether the sociocultural event associated with the communication sample is consistent with the particular population/target human subject 50 and project analyzable indicia of such evaluated sociocultural characteristics associated with the correlation (FIG. 3, element 980) so as to allow further application of the determined results.

In this regard, aspects of the system 100 may implement an analytical processing device 210 configured to receive the communication sample 200 associated with the sociocultural event involving the particular population/target human subject 50. The communication sample 200 may take many different forms, such as categories, attributes, characteristics, mannerisms, textual data, audio data and/or visual data associated with or at least partially originating from a particular target population/target human subject 50. In receiving the communication sample 200, the analytical processing device 210 may implement an interaction interface device 220 configured to receive at least one of an audio sample, a video sample, and a textual sample associated with the sociocultural event. For example, the interaction interface device 220 may comprise a microphone device configured to receive an audio sample as audio data (e.g., speech emitted by the target human subject 50). In some instances, the interaction interface device 220 may comprise a transcription device 225 in communication with the microphone device for transcribing the audio data into textual data. As another example, the interaction interface device 220 may comprise an image capturing device configured to capture a still or moving video sample as video data (e.g., one or more images or a moving video of the target human subject 50). In some instances, the analytical processing device 210 may also include a supplemental input device 230 configured to allow appropriate demographic information, whether actual or approximated, associated with the target human subject 50 to be commensurately input and associated with the collected communication sample 200. For example, the demographic information (i.e., gender, age, ethnicity, nationality, etc.) may be observed and input by an operator using a supplemental input device 230 comprising an appropriate GUI device.

Example Scenario:

An individual (target human subject 50) approaching a checkpoint station is asked to respond to an elicitation from a guard. The guard asks a specific question and the spoken response (sociocultural event) of the individual is recorded via a microphone (interaction interface device 220), thereby providing an audio sample (communication sample 200) associated with the target human subject 50. The communication sample 200, via the microphone, is recorded in .wav format using an audio recording program running on a computer interface at the checkpoint station. The collected communication sample 200 may then be transmitted as audio data via a file transfer protocol (i.e., SFTP, though the data transfer capabilities and connectivity requirements may be determined by the particular application environment using, for example, modular components tailored to the requirements of the system 100) to a central location/computer device 150 (having the analytical processing device 210) where the audio sample (audio data) may also be stored. The same computer interface at the checkpoint station may also include an appropriate terminal device (supplemental input device 230) to allow an operator to enter approximate, reported, or actual demographic information associated with the individual (target human subject 50). The demographic information may, in turn be associated with and transmitted with the audio data to the central location. A database entry may then be created in a database in communication with the analytical processing device 210, with the database entry having a reference (file name) to the audio data/audio sample and any demographic information (i.e., gender, age, ethnicity, nationality, etc.) associated therewith.

Once the communication sample 200 is received via the interaction interface device 220, the communication sample 200 may be converted by the analytical processing device 210 into a processable format for facilitating determination of an apparent cultural data element, an apparent linguistic data element and/or a contextual data element therefrom, wherein the contextual data element may further include a communicative data element. That is, the communication sample 200 may then be analyzed/processed by the analytical processing device 210, for example, using a format agreement procedure/algorithm, to determine relevant communication metadata characteristics (i.e., the apparent cultural data element, the apparent linguistic data element and/or the contextual data element, including the communicative data element) defined, for example, by informed experts and/or included in a compilation of such metadata characteristics stored in an appropriate database. For example, the communication sample 200 may be analyzed using emergent theme analysis to generate a symmetrical matrix of apparent cultural and/or linguistic data elements (i.e., cultural and/or linguistic characteristics exhibited by or observed of the target human subject 50). The apparent cultural and/or linguistic data elements may further be time-related to each other so as to indicate, for instance, an observed/actual metadata profile of the target human subject 50. That is, certain cultural/linguistic indicia which appear in the communication sample 200 within a particular time span, such cultural/linguistic indicia being determined by informed expertise (i.e., an expert and/or through empirical observation), are annotated as having a positive coincidence within the communication sample 200. The annotated cultural/linguistic resultants may then be entered into or otherwise associated with the symmetrical apparent cultural/linguistic data element matrix. In this manner, any apparent cultural and/or linguistic data elements in the communication sample 200 are identified and annotated as appropriate metadata characteristics and used to form a corresponding table. The resulting table of the annotated metadata characteristics thus comprises the observed metadata profile of the target human subject 50.

Example Scenario:

The audio data of the audio sample collected from the target human subject 50 is analyzed by the analytical processing device 210 for the presence of multiple linguistic characteristics, including any consonant cluster reduction, therein (i.e., contextual data elements, including communicative data elements). For example, a wavelength analysis may be conducted using appropriate signal processing to determine any wavelength groups corresponding to reduced consonant clusters and/or other linguistic characteristics, corresponding to appropriate consonant clusters and linguistic characteristics included in a contextual/communicative data element database. A natural language processing component (transcription device) may also be implemented to generate a transcript of the audio sample. The generated transcript may be further analyzed for any apparent cultural/linguistic data elements corresponding to appropriate cultural/linguistic data elements included in a cultural/linguistic data element database. In some instances, each analysis may be configured for adaptive learning, whereby the results of such analyses are incorporated in to the respective contextual/communicative data element and cultural/linguistic data element databases such that subsequent analyses are better informed and progressively improved, even within a single communication sample 200.

Once the contextual data elements, including any communicative data elements, have been determined by the analytical processing device from the communication sample 200, the observed contextual/communicative data elements are then profiled according to empirically-determined data contained in an appropriate database 300, using a correlative processing device 310 in communication with the analytical processing device 210. More particularly, the correlative processing device 310 may be configured to receive the contextual and/or communicative data element, and to correlate the contextual/communicative data element with one of a projected cultural data element and a projected linguistic data element expected of a corresponding hypothetical human subject. In this manner, the contextual/communicative data element may be related to a projected metadata profile of the hypothetical human subject (i.e., a hypothetical human subject who would exhibit the contextual/communicative data element under similar circumstances).

As such, one aspect of the present invention is directed to the database 300 and the manner in which it is formed and maintained, as shown, for example, in FIGS. 1 and 2. Since the database 300 provides the correlation source for the contextual/communicative data element of the communication sample 200 obtained from the target human subject 50, the data within the database 300 should be sufficient to establish or project a hypothetical human subject from a correlation of cultural/linguistic data element matrices of empirically-analyzed human subjects having similar metadata profiles. As such, the metadata characteristics of individual or group/population samples which populate the database 300 may be generated in a similar manner as for the observed target human subject 50, except that known or otherwise established control criteria are implemented to provide certainty to the information associated with the database-populating samples. Establishing the database 300 in this manner thus allows for a priori recognition of connections/correlations between samples based on, for example, demographic information and known or otherwise established affiliations.

More particularly, in one aspect, a data processing device 400 associated with the database 300 is configured to receive control communication samples from a defined cultural group of human subjects, the control communication samples including general linguistic and cultural categories and attributes 800 defined according to data collection requirements. Such control communication samples may be obtained, for example, from cultural, linguistic and application-specific subject matter experts 810 (i.e., opining with respect to a particular application or situation, or with respect to a particular language and/or culture, or with respect to sociology based on, for instance, gender, race, or nationality), and/or according to a particular requirement determination 820 (i.e., particular linguistic elements). Further, such control communication samples may be based, for example, on informed input determined by requirements and restrictions of particular applications and/or environment, and may thus be associated with a particular context of implementation or utilization. In addition, language and/or cultural categories, attributes, characteristics, mannerisms, application requirements, and technical advisories may be provided by informed sources/subject matter experts, and also associated with the control communication samples.

Once the raw data is collected, the data processing device 400 may be further configured to convert the control communication samples into a processable and extractable format using, for example, a communication format agreement procedure 830, in accordance with any applicable data requirements. The control communication samples may thus be further separated into control cultural characteristics 840 and control communicative characteristics/control linguistic characteristics 850. Further, in some instances, control source profiles formed from the control cultural characteristics and control communicative characteristics/control linguistic characteristics of the control communication samples, may comprise demographic determinants which, in turn, may be used to select other subsequent human subjects within the defined cultural group for additional control communication sample collection used to increase the scope and content of the database 300. In other instances, the established control source profiles may provide, for example, an investigation format and/or guided elicitations be used to gather communication samples 200 from appropriate target human subjects 50. When provided with such adaptive and learned controls, the database 300 may be continually expands through continued input of controlled data so as to form a continually evolving characterization of a conceptual sociological/cultural event.

A cultural data processing device 410, associated with and in communication with the data processing device 400, may be configured to associate the control cultural characteristics of the control communication samples with corresponding cultural data elements so as to define empirically-determined cultural data elements 860. Such cultural data elements may be obtained, for example, from subject matter experts 870 opining on particular cultures and/or languages associated with such cultures. Further, a communicative data processing device 420, also associated with and in communication with the data processing device 400, may be configured to associate the control communicative characteristics of the control communication samples with corresponding communicative data elements so as to define empirically-determined communicative data elements, and to associate the control linguistic characteristics of the control communication samples with corresponding linguistic data elements so as to define empirically-determined linguistic data elements (collectively 880).

A database processing device 430, in communication with the cultural data processing device 410 and the communicative data processing device 420, and also associated with the data processing device 400, may be configured to select control cultural data elements from the empirically-determined cultural data elements using a network analysis procedure 890 (i.e., attribute network analysis), and to combine the control cultural data elements to form a composite conceptual network defining social aspects of a projected cultural data element and/or projected linguistic data element. The database processing device 430 may be further configured to select control communicative data elements 900 from the empirically-determined communicative data elements and empirically-determined linguistic data elements, wherein the control communicative data elements define communicative aspects of the projected cultural data element and/or projected linguistic data element. The database processing device 430 may also be configured to correlate the control communicative data elements with the control cultural data elements by mapping the control communicative data elements with the composite conceptual network, wherein the control cultural data elements having the control communicative data elements mapped thereto may then be integrated so as to form the database 300.

With access to the database 300 developed and determined as disclosed, the communication sample 200 obtained from the target human subject 50 may then be analyzed by the analytical processing device 210, in some instances, at least partially using the empirically-determined data contained in the database 300, to determine the apparent cultural data elements and/or apparent linguistic data elements (including contextual and/or communicative data elements) demonstrated by the target human subject 50 in the communication sample 200.

Example Scenario:

An example apparent linguistic data element table (which may include contextual and/or communicative data elements) for an audio sample obtained from a target human subject 50 is shown below. The Boolean character "!" in the table denotes, for example, an utterance by the target human subject 50 which may demonstrate characteristics specific to a particular language or dialect, but do not necessarily correspond to the analysis model used by the analytical processing device 210 to analyze the communication sample 200.

Once the apparent linguistic data elements of the communication sample 200 have been determined, the apparent linguistic data elements may be correlated by the analytical processing device 210 (in some instances, with the database 300) using, for example, an emergent theme analysis, to generate a matrix (in some instances, a symmetrical matrix) of apparent cultural data elements. That is, the analytical processing device 210 may be configured to receive the apparent linguistic data elements, and to correlate the apparent linguistic data elements with an apparent cultural data element associated with the target human subject 50 to form a projected metadata profile of the target human subject 50. The apparent linguistic data elements may also be time-related to each other (i.e., relative association) to determine, for example, an apparent cultural profile of the target human subject 50. That is, particular data elements which appear in the communication sample 200 within a particular time span (wherein such relationship may be determined, for example, by informed sources such as subject matter experts) may be annotated as having a positive coincidence. The annotated (i.e., binary) resultants may then be entered into the matrix of apparent cultural and/or linguistic data elements in association with the target human subject 50.

Example Scenario:

An example matrix of projected cultural and/or linguistic data elements associated with a target human subject 50 is shown below:

| Attribute | Arabic | Gloss | Utterances | | | |
|---|---|---|---|---|---|---|
| | | General Arabic Colloquial | | | | |
| Interjection | يعني | "Umm" | 3.03.26 | 3.25.90 | 3.31.74 | |
| Lexicon | خلاص | "Complete"/"Done" | 3.21.67 | 3.22.36 | | |
| Lexicon | هين | "Here" | | | | |
| Lexicon | في | "There is" | 3.08.29 | | | |
| Lexicon | مش | "not" | | | | |
| Lexicon | تمام | "Good" | 3.01.12 | | | |
| | | Levantine Colloquial | | | | |
| Lexicon | ممكن | "Maybe" | 3.17.67 | | | |
| Grammar | ب + verb | Present tense prefix | 3.18.01 | 3.20.01 | | |
| Lexicon | عشان | "Because" | 3.30.24 | | | |
| Lexicon | هيك | "It is" | 3.30.44 | | | |
| Lexicon | بس | "But" | 3.24.05 | 3.40.36 | | |
| Lexicon | مافيش | "There is not" | | | | |
| Consonant Shift | ت to ث | \|th\|-\|t\| | | | !3.10.01 | !3.06.11 |
| Consonant Shift | ق to ء | \|q\|-\|'\| | 3.04.66 | | | !3.096.55 |
| Consonant Shift | ز to ث | \|th\|-\|z\| | | | | |
| | | Other Colloquial (Egyptian) | | | | |
| Lexicon | بس | "But" | 3.24.05 | 3.40.36 | | |
| Lexicon | بوس | "Look" | | | | |
| Lexicon | مافيش | "There is not" | | | | |
| Consonant Shift | غ to ج | \|j\|-\|g\| | | | | !3.44.51 |
| Consonant Shift | ت to ث | \|th\|-\|t\| | | | !3.10.01 | !3.06.11 |

|  | Customs | Vast Difference | Way of Life | Arabness | Living | The Middle East | Limited | Limit in thinking |
|---|---|---|---|---|---|---|---|---|
| Customs |  |  | 1 | 1 | 1 |  |  |  |
| Vast Difference | 1 |  |  |  |  |  |  |  |
| Way of Life | 1 |  |  |  |  |  |  |  |
| Arabness | 1 |  |  |  |  |  |  |  |
| Living |  |  |  |  |  |  |  |  |
| The Middle East |  |  |  |  |  |  | 1 | 1 |
| Limited |  |  |  |  |  | 1 |  |  |
| Limit in thinking |  |  |  |  |  | 1 |  |  |
| Culture |  |  |  |  |  | 1 |  |  |
| Opinions |  |  |  |  |  | 1 |  |  |
| limit is the sky |  |  |  |  |  |  |  |  |
| No Limit |  |  |  |  |  |  |  |  |
| Egypt |  |  |  |  |  |  | 1 |  |
| Director/Manager |  |  |  |  |  |  |  |  |
| The Youth |  |  |  |  |  |  |  |  |
| Thinking/Way of thinking |  |  |  |  |  |  |  |  |
| The West |  |  |  |  |  | 1 | 1 | 1 |

|  | Culture | Opinions | limit is the sky | No limit | Egypt | Director/Manager | The Youth | Thinking/Way of thinking | The West |
|---|---|---|---|---|---|---|---|---|---|
| Customs |  |  |  |  |  |  |  |  |  |
| Vast Difference |  |  |  |  |  |  |  |  |  |
| Way of Life |  |  |  |  |  |  |  |  |  |
| Arabness |  |  |  |  |  |  |  |  |  |
| Living |  |  |  |  |  |  |  |  |  |
| The Middle East | 1 | 1 |  |  |  |  |  |  | 1 |
| Limited |  |  |  |  | 1 |  |  |  | 1 |
| Limit in thinking |  |  |  |  |  |  |  |  | 1 |
| Culture |  |  |  |  |  |  |  |  | 1 |
| Opinions |  |  |  |  |  |  |  |  | 1 |
| limit is the sky |  |  |  |  |  |  |  |  |  |
| No Limit |  |  |  |  | 1 |  |  |  | 1 |
| Egypt |  |  |  |  |  |  |  |  |  |
| Director/Manager |  |  |  | 1 |  |  |  |  |  |
| The Youth |  |  |  |  |  |  |  | 1 |  |
| Thinking/Way of thinking |  |  |  |  |  |  | 1 |  |  |
| The West | 1 | 1 |  | 1 |  |  |  |  |  |

Having determined the apparent cultural and/or linguistic data elements of the target human subject 50 from the communication sample 200, the contextual and/or communicative data elements in the communication sample 200 may be correlated with the database 300, for example, through relational queries of the various metadata profiles populating the database 300 using the correlative processing device 310, so as to determine a projected profile of the hypothetical human subject. That is, the correlative processing device 310 may be further configured to correlate the contextual and/or communicative data elements of the communication sample 200 with the database 300, comprising a plurality of empirically-determined communicative data elements associated with a plurality of empirically-determined cultural data elements and empirically-determined linguistic data elements. At least one of the empirically-determined cultural data elements, the empirically-determined linguistic data elements and the empirically-determined communicative data elements, which correlates with the contextual and/or communicative data elements of the communication sample 200, thus defines the projected cultural data element and/or the projected linguistic data element expected of the corresponding hypothetical human subject.

Example Scenario:

The target human subject 50, via the communication sample 200 may demonstrate contextual/communicative characteristics which may be related to a linguistic concept, such as consonant cluster reduction. Results which indicate a frequent reduction of final consonant |nd| clusters to |n| may provide certain contextual and/or communicative data elements which can be used by the correlative processing device 310 to correlate with other projected metadata profiles in the database 300 exhibiting a similar percentile of final consonant cluster reductions. Those correlated metadata profiles in the database 300 may be further processed to determine the projected cultural and/or linguistic data elements of the archetypical profile (i.e., the projected hypothetical human subject) to which the observed/apparent cultural and/or linguistic data elements of the target human subject 50 can be compared and, in some instances, quantitatively analyzed, for conformity or disparity.

In some aspects, the projected profile of the hypothetical human subject may be generated, for example, by intercalating the metadata profiles (matrices) representing the projected profiles populating the database 300. Network analysis may then be conducted on the intercalated resultant matrix to determine any statistically significant (i.e., relevant) nodes using, for example, measures of statistical centrality. The relevant nodes may thus provide the archetypical profile (matrix) of the projected hypothetical human subject to which the apparent profile (the observed/apparent cultural and/or linguistic data elements) of the target human subject 50 can be compared.

Example Scenario:

Several types of network centrality measures can be generated for a metadata profile matrix, including:

Node Degree Centrality $$C_D(G) = \frac{\sum_{i=1}^{|V|} |C_D(v^*) - C_D(v_i)|}{n-2}$$

Betweenness Centrality, where $\sigma_{st}$ is the number of shortest geodesic paths from s to t, and $\sigma_{st}(v)$ is the number of shortest geodesic paths from s to t that pass through a vertex v.

$$C_B(v) = \sum_{\substack{x \neq v \neq t \in V \\ s \neq t}} \frac{\sigma_{st}(v)}{\sigma_{st}}$$

and Eigenvector Centrality, where M(i) is the set of nodes that are connected to the $i^{th}$ node, N is the total number of nodes and $\lambda$ is a constant.

$$x_i = \frac{1}{\lambda} \sum_{j \in M(i)} x_j = \frac{1}{\lambda} \sum_{j=1}^{N} A_{i,j} x_j$$

Once the correlative processing device 310 determines the projected cultural data element and/or projected linguistic data element expected of a corresponding hypothetical human subject, a comparative processing device 500 in communication therewith is configured to compare the apparent cultural data element and/or the apparent linguistic data element of the target human subject 50 with the corresponding projected linguistic data element and/or projected cultural data element of the hypothetical human subject to determine whether or not the sociocultural event involving the target human subject 50 is otherwise consistent with the apparent sociocultural profile of the target human subject 50. In some instances, the comparison conducted by the comparative processing device 500 may result in a determined variance between the apparent and projected data elements/profiles, wherein the variance may be associated with an importance factor, and wherein a combination of the variance and the associated importance factor may be indicative of whether the sociocultural event is consistent with the target human subject. In such instances, the comparison may essentially be quantified to provide objective indicia of the evaluation of the target human subject 50 via the communication sample 200.

The projected profile of the hypothetical human subject may, in some instances, represent a compilation or reconstruction of empirically-determined metadata characteristics or attributes. As such, some characteristics or attributes may be relatively more important than others in the comparison between the apparent and projected profiles. Accordingly, particular levels of importance (i.e., as determined by informed sources, such as subject matter experts) may be applied at the characteristic/attribute level such that the profiles are appropriately weighted (FIG. 3, element 970). The status of the characteristic/attribute and the associated level of importance assigned thereto may be employed, in some instances, to indicate acceptable tolerances across central characteristics/attributes, whereby the tolerances may provide a range against which corresponding characteristics/attributes of the observed target human subject 50 can be compared (i.e., whether an attribute exhibited by the target human subject 50 falls within a particular range of the attribute which may be exhibited by the projected hypothetical human subject). In accomplishing this weighting function with respect to the comparison, a selective processing device 600, associated with the comparative processing device 500, may be configured to apply an importance weighting factor to the apparent cultural data element and/or the apparent linguistic data element. In some instances, an importance weighting factor may also be applied to the projected cultural data element and/or the projected linguistic data element. Such importance weighting factors are applied prior to the comparative processing device 600 comparing the apparent cultural data element and/or the apparent linguistic data element with the corresponding one of the projected cultural data element and/or the projected linguistic data element, so as to assign a relative importance to the data elements in determining the consistency of the sociocultural event with the target human subject 50 and to provide a quantitative relation therebetween.

Example Scenario:

A statistical comparison between characteristic/attribute networks or profiles (i.e., between apparent and projected characteristics/attributes) may be conducted using an unequal sample, unequal variance t-test:

$$t = \frac{\overline{X}_1 - \overline{X}_2}{s_{\overline{X}_1 - \overline{X}_1}}$$

where:

$$s_{\overline{X}_1 - \overline{X}_2} = \sqrt{\frac{s_1^2}{n_1} + \frac{s_2^2}{n_2}}$$

As discussed, the comparison/difference may be calculated by characteristic/attribute with an importance factor indicating characteristic/attribute significance. In some aspects, the importance factors may be obtained, for example, from informed sources such as subject matter experts, and included in the system 100/database 300 during the control profile formation procedure, where each characteristic/attribute may be associated with an importance factor. As will be appreciated by one skilled in the art, a higher importance factor for a particular characteristic/attribute may signify a smaller tolerance of deviation by the target human subject 50.

According to one aspect of the present invention, once the results of the comparison between the apparent and projected cultural and/or linguistic data elements have been determined by the comparative processing device 500, these results may be output as appropriate. In one example, the results of the comparison may be output via an interface device 700 configured to output data associated with the determined consistency. In further instances, the outputted data may be configured for further analysis with respect to a selected application. For example, the output may range, for example, from rationale tables to decisive action guides. In one instance, the output is provided by the interface device 700 in a humanly discernible form. The output and underlying analysis may also, in some instances, be stored as a data file which may be exported to selected applications, as necessary or desired, for further processing.

Example Scenario:

The checkpoint guard may be provided with a visually discernible response on a computer interface at the checkpoint station, or on a suitable portable platform which may be carried by the guard. The response may be in a binary form (i.e., yes/no, green/red, etc.). In some instances, the response may be configured to allow the guard to take immediate appropriate action. A support analyst/operator may also be provided with one or more displays which present apparent information relating to the target human subject 50, the projected information, and the variation between the apparent and projected information. This information may also include any applicable levels of importance, and may be presented in more than one form, including visual and textual representations, as necessary or desired.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer system for evaluating a sociocultural event, said system comprising:
    an analytical processing device configured to receive and analyze a communication sample associated with a sociocultural event associated with and at least partially originating from a target human subject to determine a contextual data element and one of an apparent cultural data element and an apparent linguistic data element, each data element being associated with the communication sample;
    a correlative processing device configured to receive the contextual data element and to correlate the contextual data element with one of a projected cultural data element and a projected linguistic data element expected of a corresponding hypothetical human subject; and
    a comparative processing device configured to receive one of the apparent cultural data element and the apparent linguistic data element and to compare the one of the apparent cultural data element and the apparent linguistic data element with the corresponding one of the projected linguistic data element and the projected cultural data element to determine whether the sociocultural event is consistent with the target human subject,
    wherein the contextual data element further includes a communicative data element, and the correlative processing device is further configured to correlate the contextual data element with a database comprising a plurality of empirically-determined communicative data elements associated with a plurality of empirically-determined cultural data elements and empirically-determined linguistic data elements, wherein at least one of the empirically-determined cultural data elements, the empirically-determined linguistic data elements and the empirically-determined communicative data elements, correlated with the contextual data element, defines the one of the projected cultural data element and the projected linguistic data element expected of the corresponding hypothetical human subject, and
    wherein the system further comprises a database processing device configured to:
        select control cultural data elements from the empirically-determined cultural data elements using a network analysis procedure, and combine the control cultural data elements to form a composite conceptual network defining social aspects of the one of the projected cultural data element and the projected linguistic data element;
        select control communicative data elements from the empirically-determined communicative data elements and empirically-determined linguistic data elements, the control communicative data elements defining communicative aspects of the one of the projected cultural data element and the projected linguistic data element, and correlate the control communicative data elements with the control cultural data elements by mapping the control communicative data elements with the composite conceptual network; and
        integrate the control cultural data elements having the control communicative data elements mapped thereto so as to form the database.

2. A system according to claim 1 further comprising an interface device configured to output data associated with the determined consistency, the outputted data being configured for further analysis with respect to a selected application.

3. A system according to claim 1 further comprising a selective processing device configured to apply an importance weighting factor to the one of the apparent cultural data element and the apparent linguistic data element, and the corresponding one of the projected cultural data element and the projected linguistic data element, prior to the comparative processing device comparing the one of the apparent cultural data element and the apparent linguistic data element with the corresponding one of the projected cultural data element and the projected linguistic data element, so as to assign a relative importance thereto in determining the consistency of the sociocultural event with the target human subject.

4. A system according to claim 1 wherein the analytical processing device further comprises an interaction interface device configured to receive at least one of an audio sample, a video sample, and a textual sample associated with the sociocultural event involving the target human subject.

5. A system according to claim 1 wherein the analytical processing device is further configured to convert the communication sample into a processable format so as to facilitate determination of the contextual data element and the one of the apparent cultural data element and the apparent linguistic data element therefrom.

6. A system according to claim 1 wherein the comparative processing device is further configured to compare the one of the apparent cultural data element and the apparent linguistic data element with the corresponding one of the projected cultural data element and the projected linguistic data element to determine a variance therebetween, wherein the variance is associated with an importance factor, and wherein a combination of the variance and the associated importance factor is indicative of whether the sociocultural event is consistent with the target human subject.

7. A system according to claim 1 further comprising a cultural data processing device configured to:
    receive control communication samples from a defined cultural group of human subjects;
    convert the control communication samples into a processable and extractable format using a communication format agreement procedure; and
    associate cultural characteristics of the control communication samples with corresponding cultural data elements so as to define the empirically-determined cultural data elements.

8. A system according to claim 1 further comprising a communicative data processing device configured to:
receive control communication samples from a defined cultural group of human subjects;
convert the control communication samples into a processable and extractable format using a communication format agreement procedure; and
associate communicative characteristics of the control communication samples with corresponding communicative data elements so as to define the empirically-determined communicative data elements; and associate linguistic characteristics of the control communication samples with corresponding linguistic data elements so as to define the empirically-determined linguistic data elements.

9. A method of evaluating a sociocultural event with a computer system, said method comprising:
receiving and analyzing, using an analytical processing device, a communication sample associated with a sociocultural event associated with and at least partially originating from a target human subject to determine a contextual data element and one of an apparent cultural data element and an apparent linguistic data element, each data element being associated with the communication sample;
correlating, using a correlative processing device, the contextual data element with one of a projected cultural data element and a projected linguistic data element expected of a corresponding hypothetical human subject; and
comparing, using a comparative processing device, the one of the apparent cultural data element and the apparent linguistic data element with the corresponding one of the projected cultural data element and the projected linguistic data element to determine whether the sociocultural event is consistent with the target human subject,
wherein the contextual data element further includes a communicative data element, wherein correlating the contextual data element with one of a projected cultural data element and a projected linguistic data element further comprises correlating, using the correlative processing device, the contextual data element with a database comprising a plurality of empirically-determined communicative data elements associated with a plurality of empirically-determined cultural data elements and empirically-determined linguistic data elements, at least one of the empirically-determined cultural data elements, the empirically-determined linguistic data elements and the empirically-determined communicative data elements, correlated with the contextual data element, defining the one of the projected cultural data element and the projected linguistic data element expected of the corresponding hypothetical human subject, and
wherein the method further comprises forming the database, using a database processing device, by:
selecting control cultural data elements from the empirically-determined cultural data elements using a network analysis procedure, and combining the control cultural data elements to form a composite conceptual network defining social aspects of the one of the projected cultural data element and the projected linguistic data element;
selecting control communicative data elements from the empirically-determined communicative data elements and empirically-determined linguistic data elements, the control communicative data elements defining communicative aspects of the one of the projected cultural data element and the projected linguistic data element, and correlating the control communicative data elements with the control cultural data elements by mapping the control communicative data elements with the composite conceptual network; and
integrating the control cultural data elements having the control communicative data elements mapped thereto so as to form the database.

10. A method according to claim 9 further comprising outputting, via an interface device, data associated with the determined consistency, the outputted data being configured for further analysis with respect to a selected application.

11. A method according to claim 9 further comprising applying, using a selective processing device, an importance weighting factor to the one of the apparent cultural data element and the apparent linguistic data element, and the corresponding one of the projected cultural data element and the projected linguistic data element, prior to the comparative processing device comparing the one of the apparent cultural data element and the apparent linguistic data element with the corresponding one of the projected cultural data element and the projected linguistic data element, so as to assign a relative importance thereto in determining the consistency of the sociocultural event with the target human subject.

12. A method according to claim 9 wherein receiving and analyzing a communication sample further comprises receiving, using an interaction interface device, at least one of an audio sample, a video sample, and a textual sample associated with the sociocultural event involving the target human subject.

13. A method according to claim 9 further comprising converting, using the analytical processing device, the communication sample into a processable and extractable format so as to facilitate determination of the contextual data element and the one of the apparent cultural data element and the apparent linguistic data element therefrom.

14. A method according to claim 9 wherein comparing the one of the apparent cultural data element and the apparent linguistic data element with the corresponding one of the projected cultural data element and the projected linguistic data element further comprises comparing, using the comparative processing device, the one of the apparent cultural data element and the apparent linguistic data element with the corresponding one of the projected cultural data element and the projected linguistic data element to determine a variance therebetween, the variance being associated with an importance factor, a combination of the variance and the associated importance factor being indicative of whether the sociocultural event is consistent with the target human subject.

15. A method according to claim 9 further comprising forming the plurality of empirically-determined cultural data elements and empirically-determined linguistic data elements, using a cultural data processing device, by:
receiving control communication samples from a defined cultural group of human subjects;
converting the control communication samples into a processable and extractable format using a communication format agreement procedure; and
associating cultural characteristics of the control communication samples with corresponding cultural data elements so as to define the empirically-determined cultural data elements.

16. A method according to claim 9 further comprising forming the empirically-determined communicative data elements, using a communicative data processing device, by:
receiving control communication samples from a defined cultural group of human subjects;

converting the control communication samples into a processable and extractable format using a communication format agreement procedure;

associating communicative characteristics of the control communication samples with corresponding communicative data elements so as to define the empirically-determined communicative data elements; and associating linguistic characteristics of the control communication samples with corresponding linguistic data elements so as to define the empirically-determined linguistic data elements.

\* \* \* \* \*